Figure 1:
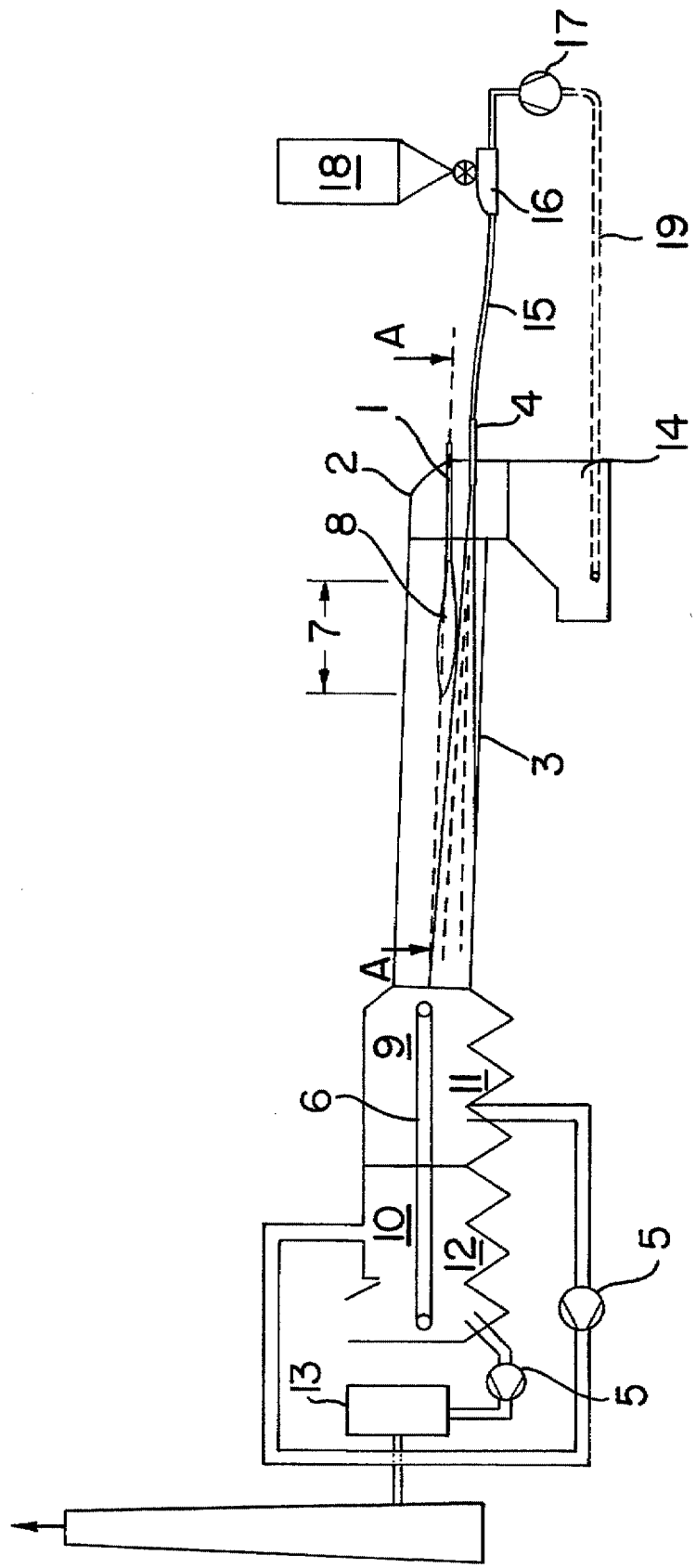

United States Patent [19]

Ziegler et al.

[11] Patent Number: 5,667,582
[45] Date of Patent: Sep. 16, 1997

[54] METHOD FOR DRY DESULFURIZING FLUE GASES

[75] Inventors: Jochen Ziegler, Schelklingen; Helmut S. Erhard, Wiesloch, both of Germany

[73] Assignee: Heidelberger Zement Aktiengesellschaft, Heidelberg, Germany

[21] Appl. No.: 708,912

[22] Filed: Sep. 5, 1996

Related U.S. Application Data

[63] Continuation-in-part of Ser. No. 524,014, Sep. 5, 1995, abandoned.

[30] Foreign Application Priority Data

Mar. 31, 1995 [DE] Germany ............... 195 12 030.2

[51] Int. Cl.⁶ .......................................... B01D 53/50
[52] U.S. Cl. ............... 106/761; 106/762; 423/244.01; 423/244.07
[58] Field of Search ............... 423/244.01, 244.07; 106/761, 762, 745, 752; 588/257

[56] References Cited

U.S. PATENT DOCUMENTS

| | | | |
|---|---|---|---|
| 3,589,920 | 6/1971 | Ostberg et al. | 106/752 |
| 4,286,993 | 9/1981 | Lovichi et al. | 106/106 |
| 4,708,855 | 11/1987 | Morrison | 423/235 |
| 4,891,194 | 1/1990 | Kubisa et al. | 423/240 |
| 5,137,704 | 8/1992 | Eschenburg | 423/235 |

FOREIGN PATENT DOCUMENTS

| | | | |
|---|---|---|---|
| 3117601 | 12/1982 | Germany. | |
| 3334106 | 5/1984 | Germany. | |
| 4004866 | 8/1991 | Germany. | |
| 8804196 | 6/1988 | WIPO | 423/244.01 |
| 9310884 | 6/1993 | WIPO | 423/244.07 |

OTHER PUBLICATIONS

"Chemical Engineers' Handbook" By Perry et al.; 5th edition; McGraw Hill Co. 1973 pp. 20–36 to 20–40 (no month).

*Primary Examiner*—Gary P. Straub
*Assistant Examiner*—Timothy C. Vanoy
*Attorney, Agent, or Firm*—Anderson Kill & Olick PC

[57] ABSTRACT

The present invention relates to a method for dry desulfurizing flue gases from rotary cement kilns, for which additives suitable for binding $SO_2$, such as quick lime and/or dry calcium hydroxide, are supplied to the kiln, the additive being introduced into a flue gas-carrying zone at the kiln head at a injection angle of 2° to 12° to the axis of the kiln and at an injection velocity of 20 to 80 m/sec.

8 Claims, 5 Drawing Sheets

METHOD FOR DRY DESULFURIZING FLUE GASES

This is a continuation-in-part application of Ser. No. 08/524,014, filed Sep. 5, 1995 now abandoned.

FIELD OF INVENTION

The invention relates to a method for dry desulfurizing flue gases by adding to the kiln quick lime, dry calcium hydroxide or both additives wherein the additive is introduced into the kiln at a certain angle and injection velocity.

BACKGROUND INFORMATION AND PRIOR ART

Various methods are known for the dry desulfurizing of flue gases of different origin. For example, such a method is proposed in the German Offenlegungsschrift 31 17 601 for dry desulfurizing and removing other impurities in flue gases from coal-fired power plants or garbage incinerators, for which dry calcium hydroxide, for example, is used as absorbent (additive). According to this method, the additive is added directly into the crude gas segment, optionally before a reactor lying in this segment and supplied to a downstream filtering installation. The solid throughput obtained here passes through one or several cyclone precipitators and can then be discharged from the associated equipment separated from the purified off-gas.

Aside from this dry purification, "wet" methods are also known. In the German Offenlegungsschrift 33 34 106, a wet method is disclosed, for which the alkaline calcium compounds are sprayed in liquid form as absorbent (additive) into the crude gas. It is a disadvantage of this method that the additive, added several times in the stoichiometric amount based on the pollutants, cannot be reacted intensively enough and, particularly in the case of fluctuations, an optimum adaptation of the dosage is hardly possible.

A better utilization of the additives and higher degrees of flue gas desulfurization are said to be attained pursuant to the German Offenlegungsschrift 40 04 866 for boilers with coal dust firings and grate firings in that suspensions of additives that bind sulfur dioxide are introduced at an elevated pressure over known nozzle systems into the free spaces carrying the flue gas.

One of the disadvantages of this method is the fact that the temperature of the suspension must not exceed or fall below certain values after the pressure is increased; for example, the temperature of the suspension must be adjusted by the indirect transfer of heat so that it is at least 10° K. above the temperature of the steam dew point temperature of the flue gas that is to be purified, but no more than 3° K. below the boiling point of the suspension at the pressure before the nozzles.

It is furthermore known that the use of sulfur-containing bituminous coal as a fuel is meaningful only if the flue gas is desulfurized at the same time. However, the costs of the chemicals and equipment required for this at least partially cancel out the price advantage of the coal. Whether and to what extent this fuel can remain competitive depends greatly on the subsidiary costs, which arise from the desulfurizing of the flue gases. The competitiveness of this coal is improved by reducing these subsidiary costs.

OBJECT OF THE INVENTION

An object of the present invention is a method for dry desulfurizing flue gases by adding to the kiln quick lime, dry calcium hydroxide or both additives wherein the additive is introduced into the kiln at a certain angle and injection velocity.

This method desulfurizes a dry flue gas for flue gases from rotary cement kilns, which will make it possible to attain an economic utilization of the additives with a degree of desulfurization corresponding to the obligations.

SUMMARY OF THE INVENTION

This objective is accomplished by the inventive distinguishing features of adding the additives quick lime, dry calcium hydroxide or both into flue-gas-carrying zone at the kiln head at an injecting angle of 2° to 12° to the axis of the kiln and at an injection velocity of 20 to 80 m/sec. Further advantageous developments of the invention arise out of the features described below.

The inventive method represents a technically simple solution to the problem of desulfurizing flue gases from the production of cement clinkers. From an equipment point of view, the inventive method can be realized with the least possible investment costs. It can be used readily with a sensitive Lepol kiln with a preheater system, as well as with a suspension-type heat exchanger kiln or a long rotary kiln. The resulting anhydrite remains in the cement clinker mass with the result that, on the one hand, no filter dusts are formed and, on the other, the amount of $CaSO_4$, which must be admixed at the plant with the clinker, is reduced.

The invention is based on the discovery that the known injection of the additive into the flue gas is one of the critical points of the method.

For the $SO_2 \rightarrow CaSO_4$ reaction by means of known additives such as $CaO$ or $Ca(OH)_2$, the $SO_2$ absorption rate decreases with time.

This is due to the fact that, during the absorption of $SO_2$, on the one hand the $SO_2$ concentration at the surface of the $CaO$ particles decreases and, on the other, a $CaSO_4$ layer is formed at the surface of the $CaO$ particles.

Furthermore, due to charging a kiln zone with the powdery additive, the contact between the additive and the waste gas takes place within a large space, so that the contact efficiency is low. Aside from this, the conversion of $Ca(OH)_2$ into $CaO$, when $Ca(OH)_2$ is used as additive, represents an endothermic reaction, which cools the kiln gases.

With this as background, the additive, pursuant to the invention, is injected at the kiln head over a lance, which can be moved pneumatically in and out. The "kiln head" is understood to be the stationary transition between the rotary kiln outlet and the clinker cooler inlet. Hot air is supplied from the cooler over the cross section of the transition to the flame as combustion air.

In order not to interfere with sensitive preheater systems (such as the Lepol grating preheater) and to counteract the inactivation of the $CaO$ particles, it is essential that the additive particles remain in contact with the flue gases of the high-temperature zone (flame region) for as short a time as possible. Pursuant to the invention, this is accomplished by the fact that air is injected into the kiln at a high velocity and at an angle of 2° to 12° to the kiln axis. Accordingly, additive particles, which cross through the kiln or are conveyed too far, are deposited at the other end of the kiln pipe.

The temperature of the flue gases of the high-temperature zone (flame region) of the kiln ranges from a minimun of 1500° C. to a maximum of 2400° C.

Pursuant to the invention, the velocity of the injected air of 20 to 80 m/sec is designed to be so high, that almost the whole volume of the kiln tube can be used as reaction zone. The design data for the lance (length, diameter) for generating a directed jet depend on the following parameters:

the kiln dimensions (length, diameter), the quality of the quick lime or of the calcium hydroxide (lime content, fineness), the absolute value to which the $SO_2$ content is to be lowered and, with that, the amount of quick lime or calcium hydroxide, the amount of delivery air.

According to an embodiment of the invention, air from the surroundings is used as delivery air. Alternatively to air from the surroundings, hot air from the clinker cooler can also be used pursuant to the invention. The temperature of this hot air depends only on the design data of the machines coming into contact with it, as well as on the heat stability of the delivery pipeline. The use of hot air only has an energy-saving effect for the kiln system; the temperature of the delivery air is of no consequence for the method of lowering the $SO_2$ content.

Figure 2:
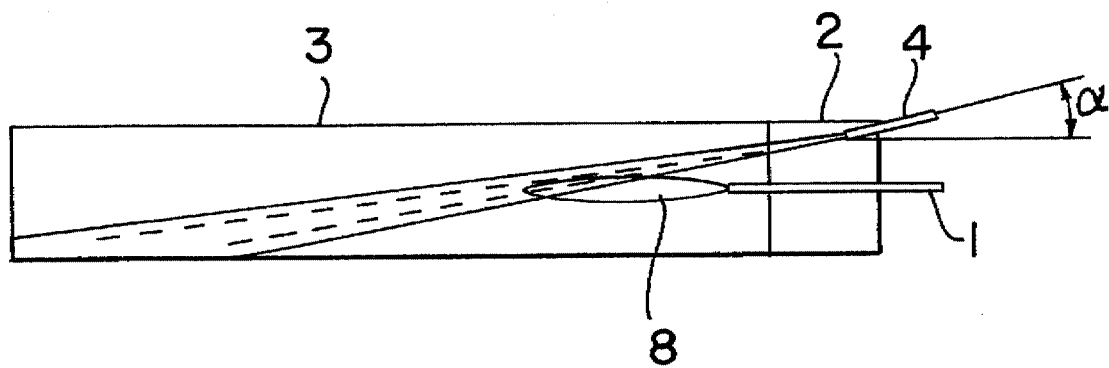
Figure 3:
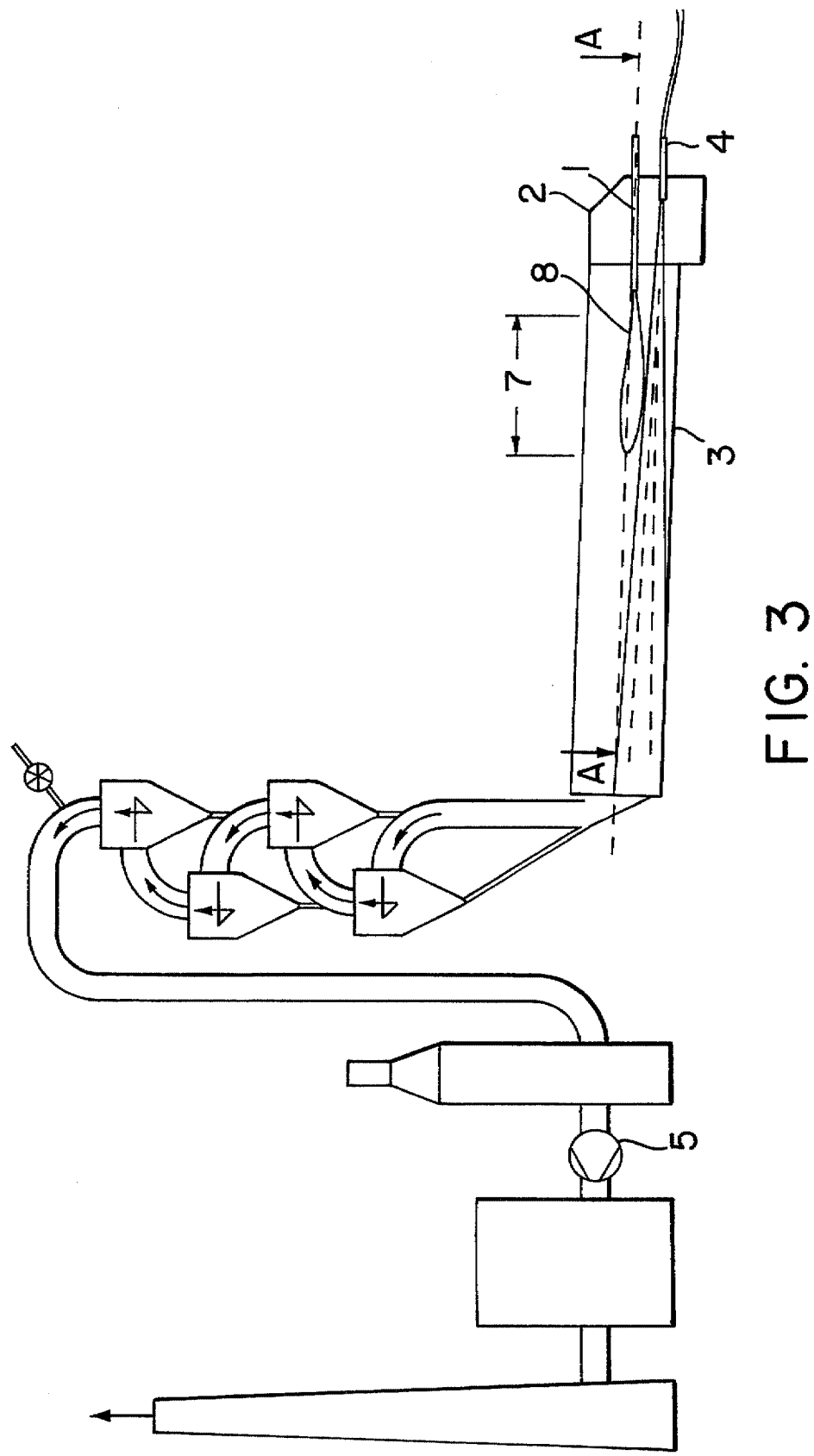
Figure 4:
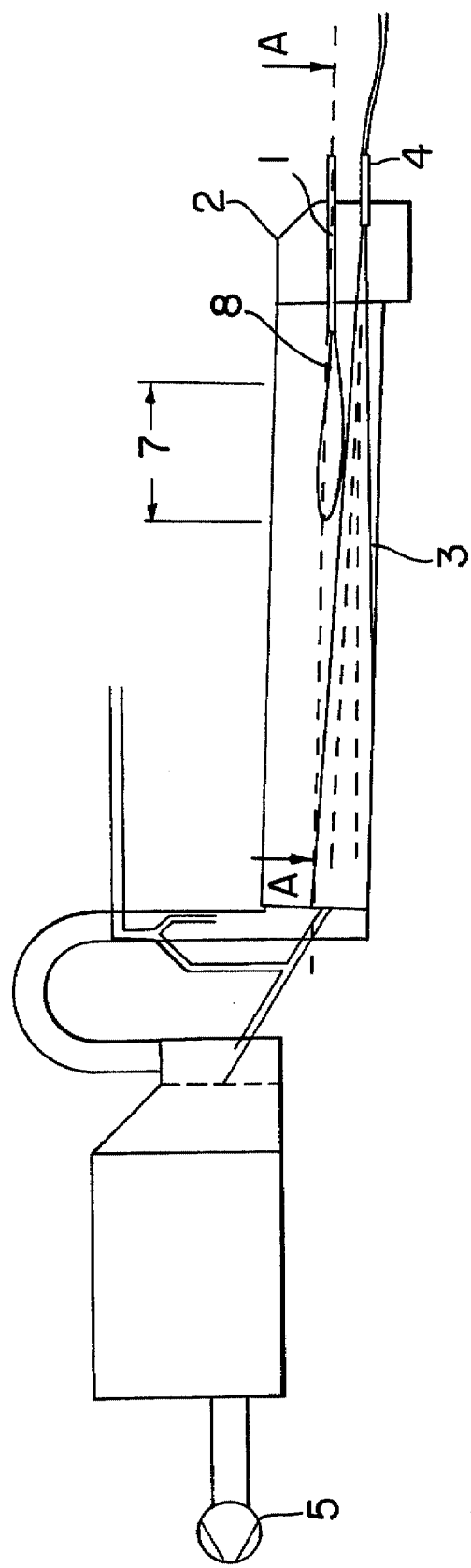
Figure 5:
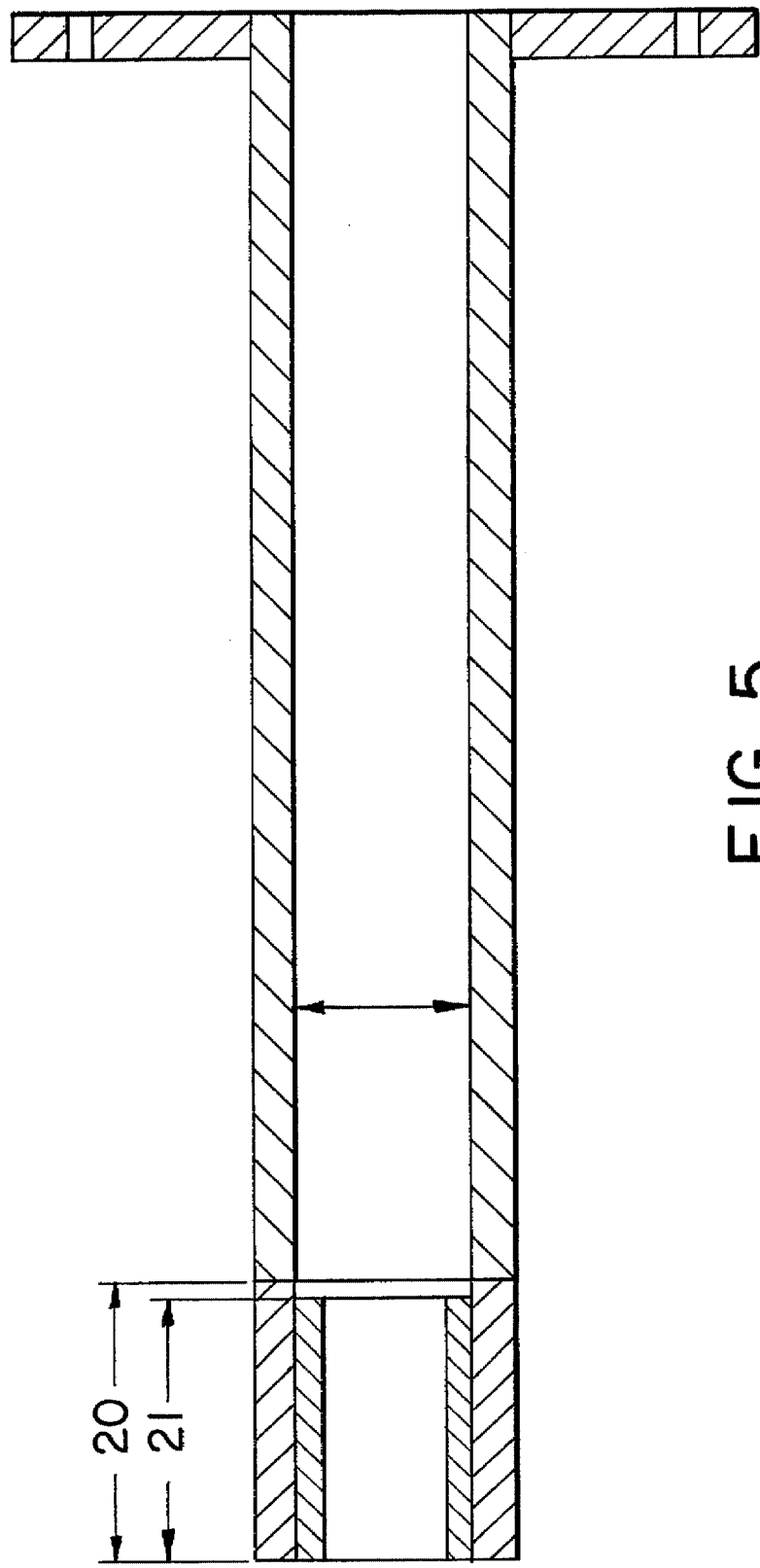

In the following, the invention is described in greater detail by means of examples (which are provided by way of illustration only and not by way of limitation) and drawings, in which FIG. 1 diagrammatically shows a cross section through a Lepol kiln with adjoining suction chambers, FIG. 2 shows a section along the line A—A of FIG. 1, from which the injection angle can be seen, FIG. 3 diagrammatically shows a cross section through a suspension-type heat exchanger kiln, FIG. 4 diagrammatically shows a cross section through a long dry kiln, and FIG. 5 shows the construction of an injection lance.

Pursuant to the Lepol method, the crude flour is charged onto a traveling grate 6 in the form of moistened pellets. The pellets are heated at about 200° to 300° C. in the drying chamber 10. Further heating to more than 1,000° C. takes place in the hot chamber 9.

The flue gases of the main burner 1, which are to be desulfurized, are aspirated twice through the pellet bed (once from the hot chamber 9 into the first suction chamber 11 and subsequently from the dry chamber 10 into the second suction chamber 12) and leave the preheater region over the second blower (flue gas blower).

The desulfurizing of the flue gases in the Lepol kiln by metering in $SO_2$ additives in the preheater region fails for the following reasons:

when these materials are brought into the hot chamber 9 or the dry chamber 10 or the first suction chamber 11, the traveling grate 6 becomes clogged with calcium hydroxide dust or quick lime dust within a very short time.

Because the resistance is then greatly increased between regions 9 and 11 or 10 and 12, the flue gas can be conveyed only incompletely and considerable amounts of carbon monoxide are formed. The formation of carbon monoxide produces a strong release of additional $SO_2$. Moreover, the fuel necessary for operating the plant must be cut back greatly. This finally leads to the production of a faulty batch.

When these materials are brought into the second suction chamber 12 or thereafter, they leave the preheater and are deposited in the filter 13.

Since the reaction between $SO_2$ and quick lime/calcium hydroxide is subjected to a distinct over-stoichiometry, not only portions of flue gas gypsum but also considerable and varying amounts of unreacted calcium hydroxide or quick lime are contained in the filter dust. The filter dust is usually added to the cement grinding; larger proportions of calcium hydroxide or also of quick lime, because of their swelling effect, can endanger or destroy the specific properties of the cement.

Should the filter dust not be admixed with the cement clinker mass, it must be disposed of, resulting in additional waste disposal costs.

For the reasons mentioned above, the quick lime or calcium hydroxide is injected at the kiln head for the inventive method, the mixture of calcium hydroxide or quick lime and delivery air being injected with a directed injection jet by means of a lance 4 at a high velocity (20 to 80 m/s, depending on the length of the kiln and of the flame) and transversely to the kiln axis at an angle alpha, in order to bring about a rapid transit through the critical high-temperature zone by these means.

The angle alpha (FIG. 2) depends on the geometry of the rotary kiln (diameter, length). It is adjusted so that, as far as possible, the whole length of the kiln is utilized as reaction space and there is practically no interference with the pre-heater. Pursuant to the invention, the angles range from 25 to a maximum of 12°.

The lance (FIG. 5) consists of a heat-resistant lance head 20. For fine regulation of the outlet velocity, the lance can be equipped with an internal insert 21. The design data of the lance (length, diameter) for producing a directed jet depend on the following parameters:

the dimensions of the kiln tube (diameter, length), the quality of the quick lime or the calcium hydroxide (lime content, fineness), the absolute level of the $SO_2$ emission that is to be lowered from/to) and, with that, the amount of quick lime or calcium hydroxide, and the amount of delivery air.

According to FIG. 1, supplies of quick lime or calcium hydroxide are usually kept in a silo 18. Quick lime/calcium hydroxide is supplied to the metering organ 16 over suitable delivery aids (such as silo ventilation, discharging cone) and mixed with the delivery air.

The delivery air is produced over at least one delivery air blower 17. The aspirated air is at room temperature (about 0° C. during winter operation and up to a maximum of 70° C. during summer operation). The delivery air blower may also be a central air-supplying unit (key word: tapping plant air).

Instead of air from the environment, hot cooling air from the clinker cooler may also be used as delivery air. The temperature of this hot air 19 depends only on the design data of the machines coming in contact with it, as well as on the heat resistance of the delivery pipeline 15. The only effect on the kiln system of using hot air is to save energy; the temperature of the delivery air does not have a significant effect on the method of lowering the $SO_2$ concentration.

The mixture of quick lime/calcium hydroxide/delivery air is supplied over an optionally flexible delivery pipeline 15 to the lance 4 and injected in a directed manner into the kiln tube.

The inventive method is also suitable for lowering the $SO_2$ content in flue gases of suspension-type heat exchangers (FIG. 3) or rotary cement kilns (FIG. 4). As in the case of the Lepol method, economic utilization of the additives can be achieved therewith with a degree of desulfurization corresponding to the obligations.

What is claimed is:

1. A method for dry desulfurizing flue gases from rotary cement kilns for the production of cement clinkers by adding to the kiln additives selected from the group consisting of quick lime, dry calcium hydroxide and a combination thereof for binding $SO_2$ comprising adding the additive into a flame region of a flue gas-carrying zone with a temperature of at least 1500° C. at the kiln head at an injection angle of 2° to 12° to the axis of the kiln and at an injection velocity of 20 to 80 m/sec.

2. The method of claim 1, comprising adding the additive through a lance as directed injected jet.

3. The method of claim 2, comprising selecting a lance geometry to ensure consistency of the outlet velocity.

4. The method of claim 2, comprising utilizing environmental air as delivery air for the additive.

5. The method of claim 2, comprising utilizing air from the clinker cooler as delivery air for the additive.

6. The method of any of claims 1, 2, 3, 4 or 5, wherein the rotary cement kiln is a Lepol kiln.

7. The method of any of claims 1, 2, 3, 4 or 5, wherein the rotary cement kiln is a suspension-type heat-exchanger kiln with at least one heat exchanger stage.

8. The method of any of claims 1, 2, 3, 4, or 5, wherein the rotary cement kiln is a long rotary kiln.

* * * * *